Sept. 23, 1969  W. J. HOUSE, JR  3,468,533
ROTATABLE PLATFORM HAVING RIDER SUPPORTS ENCLOSED IN AN
OPTICAL CHAMBER FOR SIMULATING A SPACE RIDE
Filed July 6, 1964  7 Sheets-Sheet 4

WALTER J. HOUSE JR.
INVENTOR.

BY Ely Silverman
ATTORNEY

Sept. 23, 1969  W. J. HOUSE, JR  3,468,533
ROTATABLE PLATFORM HAVING RIDER SUPPORTS ENCLOSED IN AN
OPTICAL CHAMBER FOR SIMULATING A SPACE RIDE
Filed July 6, 1964 7 Sheets-Sheet 5

WALTER J. HOUSE JR.
INVENTOR.

BY *Ely Silverman*
ATTORNEY

Sept. 23, 1969  W. J. HOUSE, JR  3,468,533
ROTATABLE PLATFORM HAVING RIDER SUPPORTS ENCLOSED IN AN
OPTICAL CHAMBER FOR SIMULATING A SPACE RIDE
Filed July 6, 1964  7 Sheets-Sheet

WALTER J. HOUSE JR.
INVENTOR.

BY *Ely Silverman*
ATTORNEY

United States Patent Office 3,468,533
Patented Sept. 23, 1969

3,468,533
ROTATABLE PLATFORM HAVING RIDER SUP-
PORTS ENCLOSED IN AN OPTICAL CHAMBER
FOR SIMULATING A SPACE RIDE
Walter J. House, Jr., P.O. Box 3446,
Amarillo, Tex. 79106
Filed July 6, 1964, Ser. No. 380,562
Int. Cl. A63j 5/00; G09b 9/08; A63g 1/02
U.S. Cl. 272—18                          1 Claim This invention relates to an apparatus for amusement and educational purposes. More particularly, this relates to an apparatus especially designed and constructed to simulate to spectators within the apparatus an extraterrestrial ride, such as a rocket trip around the planet Earth, while providing the spectators in the apparatus and subjected to the process, a sensation of weightlessness.

One object of this invention is, accordingly, to provide an apparatus designed to provide sensations which simulate an extraterrestrial ride.

Yet another object of this invention is to provide theater apparatuses adapted to provide a simulation of weightlessness to spectators therein.

Yet another object of this invention is to provide an apparatus for the generation of a sensation of weightlessness in spectators while subjecting such spectators to visual and audible sensations which simulate extraterrestrial travel.

These and other objects and advantages of this invention will become apparent to those skilled in the art on study of the below specification of which the attached drawings form a part and wherein the same numbers refer to the same parts throughout all the drawings, and wherein.

Generally, the apparatus 20 of this invention comprises a peripheral shell subassembly 22, a rotatable spectator chamber subassembly 24, and a drive and a support subassembly mechanism 40 for the spectator chamber subassembly.

Figures 1, 2:
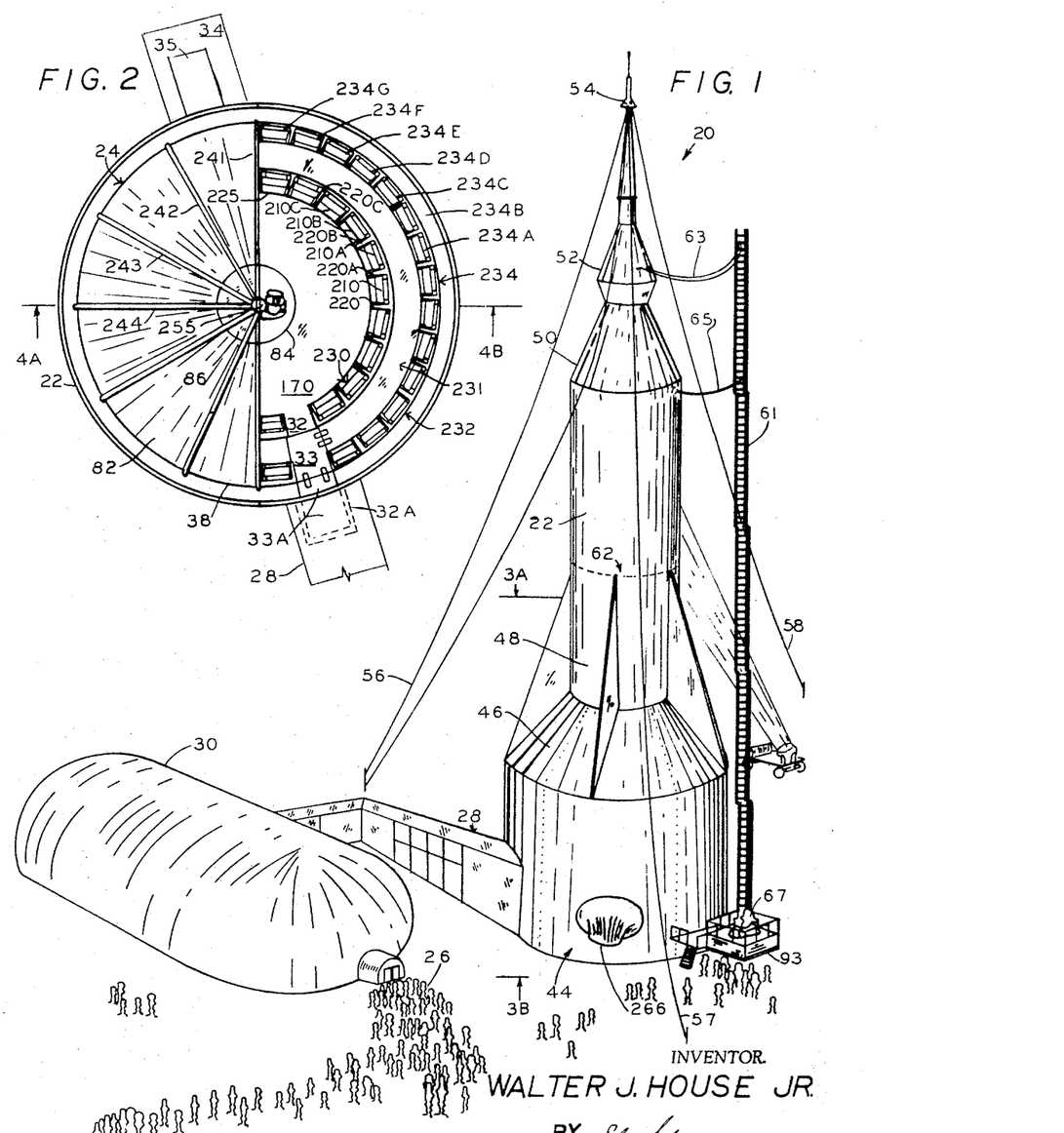
FIGURE 1 is an over-all view of an assembly of buildings for use with and including an apparatus according to this invention.
FIGURE 2 is a diagrammatic cross-sectional view of apparatus 20 along the section indicated by the stepped section surface 2A–2B–2C–2D of FIGURE 4.

The shell subassembly 22 comprises a lowermost, right, vertical, cylindrical portion 44, the top of which is continuous with and attached to a shellportion 46 thereabove: portion 46 has the shape of a truncated cone. Above and attached to and continuous with the truncated conical portion 46 is another elongated, cylindrical portion 48. An upper truncated conical portion 50 attached to thereabove and supported thereon and continuous therewith connects to a second truncated, conical portion 52, generally in the shape of a rocket booster; the top portion 54 of the shell 22 has an exterior which simulates a rocket projectile as in U.S. Patent 3,001,739, item 10 shown in FIGURE 1: this latter portion, per se, does not form any portion of this invention but is provided as an illustration of a presently preferred embodiment of shell appearance.

Preferably the subassembly 22 is entirely a rigid metallic shell.

In another embodiment within the scope of this invention, the shell subassembly 22 at a horizonal level above the level of hook 88 on top of subassembly 24, such horizontal level being indicated as 62, is a self-supporting, air-inflated building structure formed of plastic and/or rubber sheet in the general manner shown in U.S. Patent 2,921,592.

Conventional sets of guy wires as 56, 57 and 58 attached to the shell subassembly 22 and to the ground 60 hold the shell structure in position. The central longitudinal axes of all of the cylindrical surfaces 44, 46, 48, 50 and 52 are coaxial, and the central longitudinal axis of portion 54 is coaxial with such central axes along a vertical central shell axis 77.

An extended ladder assembly 61, comprising a Model 80, Baldwin Ward Manufacturing Company of Ottawa, Kans., "Sky Hook" is used to erect the shell 22 and to simulate a rocket launcher gantry. Such apparatus, after use in the erection of the apparatus 20, provides for support of pressurizing lines 63 and 65 for any air-inflated compartments of the shell 22. These lines provide for passing pressurized air from a conventional compressor, as 67, mounted on a base 93, below described, to maintain the air-inflated compartments of shell 22 in its expanded condition above described.

The spectator chamber subassembly 24 comprises a drive and support subassembly 40 and the theater subassembly 38. The theater subassembly 38 is rotatably supported for rotation about a vertical axis on supports borne by and firmly attached to the support subassembly 40.

The theater subassembly comprises a floor subassembly 31, circular spectator sled support subassembly rings 230 and 232 thereon, a theater ceiling subassembly 82 above and supported on and attached at its bottom to the top of the subassembly 232, and a projector and control subassembly 84 at the center portion of the floor 31 and operating to project pictures on the screen 86 of subassembly 82. The projector and central subassembly 84 and the ceiling subassembly 82 and the ring 230 each are located with its vertical, central longitudinal axis coaxial with the axis of rotation of the theater subassembly.

The theater subassembly is radially symmetrical about its vertical, central, longitudinal axis which is coaxial with its axis of rotation 77.

The drive and support subassembly 40 comprises a stationary, firmly supported, generally flat and level platform 91 and a spectator subassembly drive and support mechanism 92 thereon. In the preferred embodiment, in order to make the entire apparatus readily movable, platform 91 is provided by a bed truck trailer 93 arranged to be stationary and firmly supported on the ground 60. The bed of the truck 93 is supported on a conventional set 95 of eight rear wheels, of which set the right outer wheels 96 and 97 are shown, and central front jacklegs, as 99, and a plurality of laterally extending, sturdy jackleg I-beams 102 each firmly attached to platform 91 and extending to both sides of the platform 91 and each supported laterally, as by lateral jacklegs 100, to provide additional stability to the platform 91 and structures supported thereon.

The drive and support mechanism comprises a motor 101, clutch 103, pulleys, drive belts and rotatable supports for floor subassembly 31 of subassembly 24. The bed 93 supports a diesel motor 101 which is operatively connected to clutch 103 to drive a plurality of V-belts 104 and floor pulley 105. The floor pulley 105 is firmly attached to the floor subassembly 31 by a pulley support 106. The pulley support 106 is a hollow, cylindrical, thick-walled ring which has a central axis of rotation which is coaxial with the axis 77 of the shell subassembly 22. A plurality (eight in the preferred embodiment) of vertically extending U-shaped supports for floor 31, such as supports 120, 121, 122 and 123 on the bed 93 rotatably support wheels 124, 125, 126 and 127 on horizontally elongated axles. The wheels 124-127 each seat in and help support an annular raceway 128 comprising a steel U-sectioned annular channel. The channel 128 is formed of two parallel, concentric, circular, steel rings each with a vertical height of about 8 inches and a wall thickness of ¼-inch and a flat annular ring of ¾-inch steel plate and 4-inch width. The flat annular ring is joined to the top of the concentric rings firmly by welding and that flat channel is firmly fixed to the bottom of the trusses which are attached to and support the bottom of the floor surface plate 170. Also, as a safety feature, a set of six, radially equispaced, hold-down wheel support members, of which 129, 129A, 129B and 130, 130A and 130B are shown, operate to rotatably support hold-down wheels (as 131 and 132 in supports 129 and 130, respectively) in an exterior, U-shaped raceway 134 of similar structure to raceway 128 to limit vertically the plane of rotation of the floor of the spectator subassembly.

Other laterally located guide wheels 136–143 are each provided with bases therefor fixed to the bed 91, such as support 144 for wheel 141. These wheels 136–143 rotate about vertical axes and bear on the external cylindrical surface 146 of channel 128 at the bottom of an annular channel, 147 formed on the lateral surface of channel 128 and cylindrical surface 146 has its geometrical center on axis 77.

The floor subassembly 31 is a flat, circular platform trussed across its bottom and there are provided with three circular raceways in the preferred embodiment. Subassembly 31 comprises a central portion 71 and hingedly attached thereto, lateral leaf portions 73 and 75. The leaf portions each have a straight, central edge portion (150 for portion 73, and 151 for portion 75). These leaf portions 73 and 75 are each, respectively, hingedly attached to the corresponding straight, parallel side edges, 152 and 153 of the central portion 71. The circular curve of the outer peripheral circularly-curved edges 155 and 157 of portion 71 have axis 77 as a common center with the outer peripheral circularly-curved edges 159 and 160 of the portions 73 and 75. Hinges, as 161, on top of truss members as 170M connect portions 73 and 71 and corresponding hinges 166, 167 and 168 on top of truss members 170G, 170I and 170L serve to join the leaf portion 75 to the portion 71. The central portion 71 is formed of a sturdy, steel floor plate 170 provided with radial, as 170A, 170B, 170C and 170D, and chordal (as 170K, 170Q and 170P) trusses. An annular U-shaped channel 128, downwardly open, with its top firmly fixed to the trusses as 170A, 170B, 170C and 170D for plate 170 provides a recess and a raceway for all of the eight vertical support wheels such as 124–127 and its outer surface 146 provides a bearing surface for wheels 136–143. An annular disk 174 projects laterally from the bottom of channel 128 and provides a bottom edge to a raceway 147 for the radially stabilizing wheels 136–143.

Trussing members as 170F, 170G, 170I, 170H, 170E, 170E and 170M similar to 170A, 170B, 170C and 170D, of conventional design also underlie the leaf portions 73 and 75; removable locking plates as 175, 176, 177, 178, 179 and 180 are bolted to and fix the truss members of leaves 73 and 75 to truss members of member 71 so that the upper surfaces of floor portions 71, 73 and 75 together form a firm, smooth, flat, level platform.

According to this invention a spectator support sled, as 181, is provided for each spectator, as 207, in the apparatus 20. Each sled, as 181, is supported in a sled support subassembly 220. The sled 181 is a movable component of a spectator sled and sled support subassembly 210. Each subassembly, 210, comprises a spectator support sled, as 181, for subassembly 210, and on which the spectator 207 is supported, and a sled support subassembly as 220 on which the sled is supported for limited sliding movement as below described.

A plurality of identical spectator support sled and sled support subassembles, as 210, 210A, 210B and 210C are each firmly attached to and supported on the top of the horizontal floor surface 170. These subassemblies are symmetrically arrayed on a circle 225 which has its center on the vertical axis 77. The sled support assemblies 220, 220A and 220B each are removably, yet firmly, bolted to the floor 31 and form a first, lower ring of contiguous, joined-together sled support subassemblies, which ring is generally shown as 230. Each member of this ring is firmly joined at its bottom and at its top to its neighboring sled support subassembly, e.g., sled support subassembly 220A is joined at its bottom and top to its neighboring subassemblies 220 and 220B.

Figure 3:
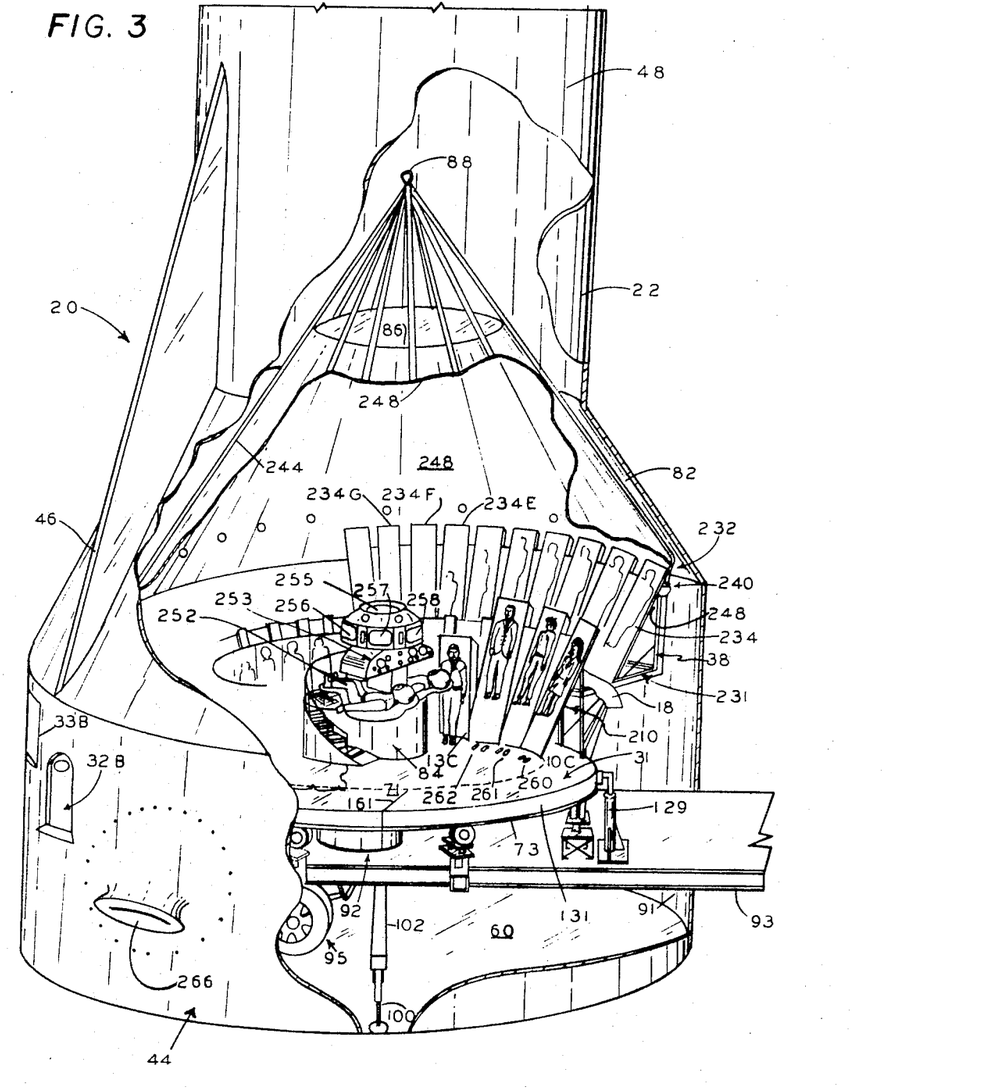
FIGURE 3 is a partially broken away and partially perspective view of the portion of apparatus 20 shown in the zone between horizontal planes shown as 3A and 3B of FIGURE 1.
Figure 4:
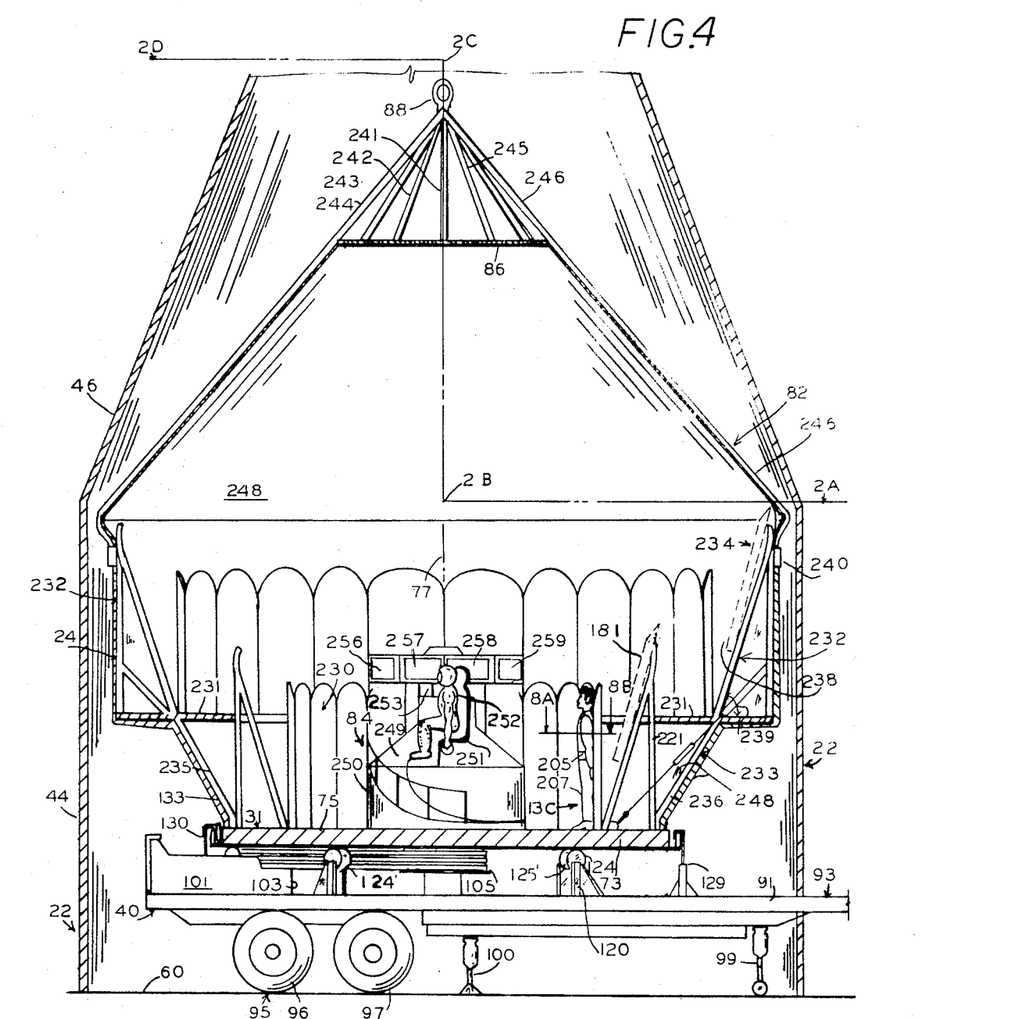
FIGURE 4 shows a central, longitudinal, cross-sectional view along plane 4A–4B of FIGURE 2 of the passenger support subassembly 24 of FIGURE 3 and a side view of the drive and support subassembly 40 therefor.
Figure 5:
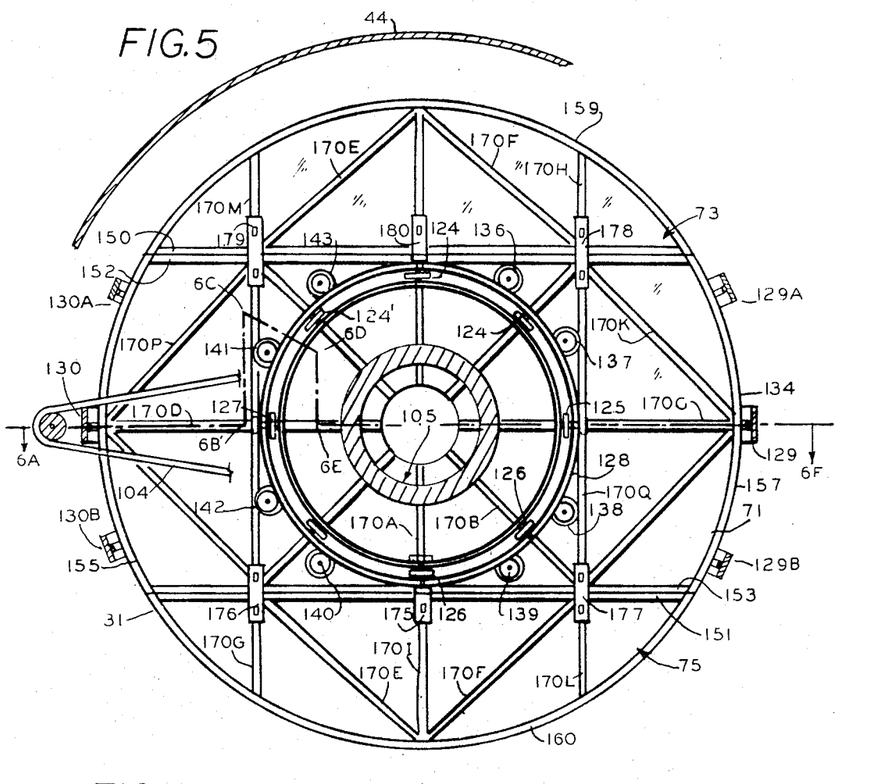
FIGURE 5 is a bottom view of the spectator compartment floor subassembly 31 as seen along section 5A–5B–5C–5D of FIGURE 6.
Figure 6:
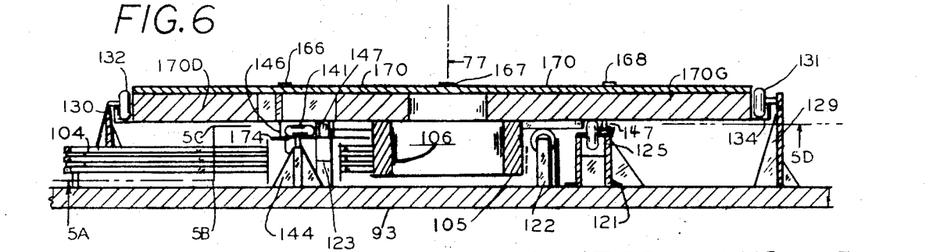
FIGURE 6 is a vertical, generally diametral, sectional view of the spectator compartment floor subassembly 31 and portions of the drive mechanism therefor as seen along the section 6A–6B–6C–6D–6E–6F of FIGURE 5.
Figure 7:
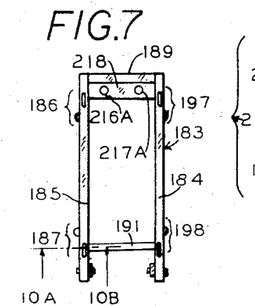
FIGURE 7 is a plan view of a spectator support sled frame 183 according to this invention.
Figure 8:
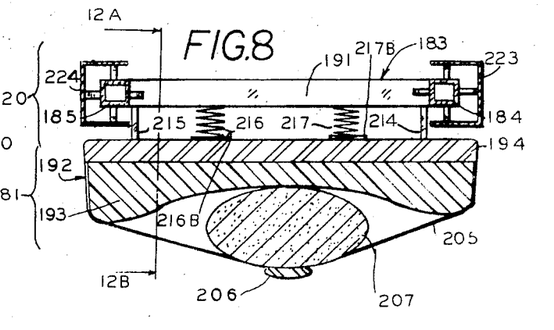
FIGURE 8 is a transverse, cross-sectional view along plane 8A–8B of FIGURE 4 of an assembly, 210, of a spectator support sled subassembly 181 and sled support subassembly 220 and a spectator 207.

In a preferred embodiment of this invention shown in FIGURES 3 and 4, a second radially outer and upper tier or ring 232 of sled and sled support subassemblies, as 234A, 234B, 234C, 234D and 234E, each of said assemblies comprising a sled support subassembly and sled subassembly carried therein, as in assemblies 210, 210A and 210B. The upper ring, or tier 232, is an annular array of identical assemblies as 234A–234G with its center on axis 77: the component sled support subassemblies thereof are each rigidly attached to the auxiliary tier support platform 231.

A spectator support sled subassembly, as 181, is slidably supported in each of the sled support subassemblies as 220. Each spectator sled subassembly, as 181, comprises a rectangular frame 183 freely slidably movable in the sled support subassembly therefor, and a cushion subassembly 192 firmly attached to said frame. Frame subassembly 181 comprises a pair of spaced-apart, straight, parallel, square sectioned, longitudinal steel channels 184 and 185, each firmly joined as by welding to upper and lower transverse members 189 and 191, respectively. The frame 181 supports a contoured spectator support cushion subassembly 192. The longitudinal frame members, as 185, each are provided near its upper and lower end respectively, with an upper pair of wheels 186 and a similar lower pair of wheels 187. Pair 187 comprises a peripheral wheel 195 rotatably mounted about an axle shaft with its longitudinal axis parallel to the length of the transverse member 189 and a wheel 196 rotatably mounted on an axle shaft with its longitudinal axis of rotation normal to the length of the transverse members 189 and 191, as well as perpendicular to the longitudinal axis of the longitudinal member 185. Sets of wheels 197 and 198, each similar to sets 186 and 187, are provided on the member 183. In the preferred embodiment the members 184, 185, 189 and 191 are all conventional, sturdy steel, square sectioned channel members.

The cushion subassembly 192 comprises a contoured cushion 193, spectator belt 205 and a cushion support frame 194. The cushion 193 is mounted on the front surface of cushion support frame 194. The support, 194, for the cushion is a flat sheet of steel. Angles 214 and 215 are firmly attached to the rear of frame 194 and are pivotally mounted on the frame 183. Springs as 216 and 217 each extend from a seat as 216A and 217B, respectively, supported on the longitudinal and transverse members 185, 187 and 184 to a spring seat as 216B (for 216) on the rear of the cushion frame 194. This spring arrangement urges the cushion and cushion frame into vertical position. This is a yielding and resilient urging and, when overcome, the cushion and frame sled subassembly 192 is directly supported on the sled frame 183. Each cushion subassembly 192 is provided with a belt 205, the ends of which are firmly attached to frame 194 for attachment of the torso 207 of the spectator to the movable sled. The belt has a conventional buckle 206 readily released or fastened by the spectator.

Each sled support subassembly, as 220, comprises a pair of rigid, equisized, vertical members 221 and 222 which are parallel to and fixed to each other and to floor 31. Each firmly attaches to and supports a mirror image, parallel, U-shaped channel member, as 223 and 224. Each channel member, as 224, slidably holds the therein located sled frame member as 185 and its wheel sets, as 186 and 187. The channel-shaped members 223 and 224 provide a path for the rolling movement of wheel sets as 186, 187, 197 and 198 along the length of said members. Thereby, each sled frame subassembly as 181 is smoothly movable upwards and outwards in a path of predetermined length and angle parallel to the length of channels 223 and 224. This path is initially at an angle 229 to the horizontal plane of the top surface 170 of the floor 31 for subassembly 220.

All the subassemblies as 220, 220A, 220B and 220C in the lower ring 230 are all at the same distance from the axis of rotation 77 of the floor 31 and support the sled subassemblies as 181 thereon when in contact with the floor 31 all at the same angle relative to said axis 77. Thus, in the preferred embodiment the channels of all the sled support elements of ring 230 meet the top floor surface 170 in a circle 225 with its center at axis 77. In the preferred embodiment, the channels as 223 and 224 of each sled support subassembly are evenly curved after a definite straight length portion as below described and the radius of curvature of such curve is 12 feet with the convexity outwards. This permits a simultaneous "floating" or equilibrium location of all of spectator support subassemblies, as 181, between the top and bottom of the supports, as 220, therefor by a close control of the rotational velocity of the apparatus 24.

A raised, flat, annular platform 231 centered about axis 77 is supported on an annular series of similarly radially equispaced and equisized trusses (of which 235 and 236 are shown) forming an outer tier frame 233 and on the vertical members, as 221, of the sled support frames of the lower tier 230. An upper and outer circular ring 232 of sled and sled support subassemblies, such as 234A, 234, 234B, 234C, 234D, 234E, 234F and 234G, each identical to each other and each equidistant from axis 77 and each structurally similar to subassembly 210 except that the angle 239 to the horizontal of the plane of initial upward movement of the sled thereon in greater than the corresponding angle 229 for the lower, inner ring of the sleds on the inner, upper surface 170 of the floor, 31, is firmly supported on platform 231.

In outline, generally, the roof subassembly 82 is a truncated right, circular cone, the flat top of which forms a screen 86. The roof subassembly 82 comprises a series of roof stringer bars each firmly attached at one end to a horizontal ring 240, firmly attached to the top of the sled subassembly supports of the upper tier 234. All the roof stringer elements, as 241–246, extend to an elevated hook 88 located on the central longitudinal axis 77 of rotation of the floor 31. Hook 88 is used for purpose of erection and assembly of assembly 24. The stringers support interiorly an interiorly blackened and opaque sheet 248 which extends from the floor 31 to the screen 86, said sheet 248 made of wood or other sound-insulating material. The truncated conical portion of the ceiling terminates at the level of the screen 86. The surface of screen 86 is a conventional motion picture projection screen surface.

The projection apparatus subassembly 84 comprises an operator and control platform subassembly 250 fixed to the floor 31 with a seat support 251 for the operator 252. It comprises also an instrument dial and control handle console 253 for view and manual control by the operator 252. The console is operatively connected to controls for (and thus operator 252 controls) the motor 101 and clutch 103, as well as the motion picture projection and sound apparatus below described. A motion picture projector 255 is supported within the housing 250 and is connected to the console and controlled by the operator 252. The lens system of the projector 255 has an optical axis identical to the axis 77. This optical system is focused on the screen 86.

The operator 252 is seated sufficiently close to the console 253 to operate the controls for a sound apparatus 249 broadcasting to the interior of the subassembly 38 and a plurality of television camera screens 256–259 which are mounted in the platform 250 at a sufficient height to be readily visible by spectators on the various sleds in the sled subassemblies on the upper and lower tiers during operation of the apparatus 20.

In the preferred embodiment the floor 31 is composed of a central section 71, 8 feet wide and two leaf portions each 6 feet wide, for a total diameter of 20 feet. Each of the sled subassemblies 181 has a total width of 2 feet, there are places for 17 people in the first row and 29 people in the second row. In the particular embodiment of this invention herein described floor 31 may be revolved at 37.8 r.p.m. and the angle 229 with the horizontal of the plane provided through the wheel subassemblies of each of the sled subassemblies, as 183, would be 15° to the vertical in the lower tier 230 and 10° from the vertical in the upper tier 234. Other relations may, however, be used; generally the formula for the values of angle 229 and 230 is given substantially in the following formula:

$$4\pi^2 n^2 r \cos \alpha \sin \alpha = g$$

wherein $n=$ revolutions per second of subassembly 24,
$\alpha=$ angle between plane of initial upward movement of sled subassembly and the horizontal,
$r=$ minimum distance in feet from axis 77 to the intersection of the plane of initial movement of that sled subassembly and the horizontal floor surface 170, and
$g=$ acceleration due to gravity.

Thus, at 37.8 r.p.m. angle $\alpha=80°$ and $r=12$ feet for subassemblies 234, 234A, 234B, 234C in ring 232; for the subassemblies as 210, 210A, 210B and 210C, in ring 230 at the same r.p.m. $\alpha=75°$ and $r=8.2$ feet, by calculation as per above; in an actual embodiment $r234=14$ feet $\pm \frac{1}{2}$ inch, $n=24\pm.5$ r.p.m., and angle $229=65°\pm1°$.

The data obtained with such embodiment agrees with the above formula within the errors due to limits of precision of measurement of $n\pm2\%$, $\alpha\pm1°$ and $r\pm0.5\%$. The scope of the claim hereto attached is intended to include the variations in the values of $n$, $\alpha$, and $r$ within such variations.

In the operation of this apparatus spectators enter into the apparatus 20 from the inlet ramp 28 from the feeder building 30 through lower tier entrance 32 and upper tier entrance 33.

The spectators pass by upper tier inlet ramp 33 to the upper platform 231 and by lower tier ramp 32 to lower tier 230. Hinged ramp portions 32A and 33A, which extend from the ramp to the tier, are folded out of the way of rotation of apparatus 24 and the entrances 32B and 33B made light-tight prior to movement of subassembly 24. The use of a separate entrance for each tier avoids spectator falls within the apparatus. The apparatus is provided with coded foot place markers, as 260, 261 and 262, for each of the spectators to properly place his feet in front of each cushion subassembly, as 192, and in order to allocate the location of persons in the apparatus prior to rotation thereof for optimum balancing thereof.

After all the spectators have fastened their belts 205, the operator 252 dims the lights in subassembly 24 and, when dark, begins the acceleration of the apparatus 24 about the axis 77 of rotation thereof while broadcasting a description of and projecting pictures of a simulated space flight onto the television screens 256, 257, 258 and 259. Inasmuch as the apparatus 20 is, with ceiling 248, a complete optical enclosure with no view outwards, the acceleration may be, and is, raised at the rate of $\frac{1}{20}$ r.p.m. per second. More particularly, the rate of change of acceleration A with time T follows the formula of $$\partial A / \partial T = 0.05 \text{ r.p.m./second}$$

This is intended to be and is substantially imperceptible to the spectators in the closed system 24 above described: within 10 seconds the acceleration of the apparatus 24 is sufficiently rapid that the centrifugal force to which the sleds are subjected is sufficient to overcome the force of the springs 216. These springs only have a limited tension, i.e., a force when extended to 12 inches, of 10 pounds. Within 13 minutes the velocity of subassembly 24 overcomes the force of gravity acting on the spectators in their sleds: the rotational velocity of subassembly 24 is then held constant ($\pm0.10$ r.p.m.) and serves to simultaneously maintain all the spectators in their sleds at an elevated, balanced position, as 10C.

The operator 252 in his broadcast describes in sequence the events which occur during a usual extraterrestrial space vehicle ride while the rotational velocity of the apparatus 24 increases. The description of the events also includes showing to the spectators on the television screens, as 256, 257, 258 and 259, a view of the apparatus 20 with smoke coming out of the exhaust 266 while a noise similar to a rocket blast-off is provided to the spectators by loud-speaker system 249. The exhaust is made white by the addition of ammonia to the exhaust of the conventional internal combustion engine motor 101, which motor feeds the exhaust 266. At the time in the sequence of the simulated ride when the spectators are shown views on screen 86 corresponding to a position in space whereat the force of gravity is overcome in the space vehicle described, the operator 252 calls to the attention of the spectators that they are then virtually weightless; they are then supported by the centrifugal force which lifts all the sleds, as 181, and the spectators therein, from the floor 31 to an elevated equilibrium position, as 10C. This circumstance provides a feeling or experience of levitation to each of the spectators on a spectator support sled while such spectator is watching a projection of a motion picture on the screen 86 providing the same view of the screen 86 as he would see were such spectator actually traveling in a space vehicle.

Further, this visual stimulation provided by the motion picture projected on screen 86 is taken from, or by, a true extraterrestrial space vehicle and shows a view of the earth as seen from such space vehicle at a point in space at which the vehicle and its occupant would be substantially weightless, i.e., at a point at which the centrifugal force to which the vehicle from which the picture is taken receives a centripetal force equal to the force of gravity. Accordingly, when the spectators are told by the statements from the operator 252 and then view the projection of the motion picture on the screen 86 corresponding to a position and motion in space of a weightless body, the spectator is at that point supported by centrifugal force developed by rotation of subassembly 24 and spectator and subassembly 192 have at that point been raised from the floor 31 to the elevated position as 10C. Accordingly, this apparatus 20 provides concurrently to the spectator the visual and audible stimulation of a situation of weightlessness while directly subjecting the spectator to a kinesthetic feeling of weightlessness. Following the recital and presentation of stimuli descriptive of the situation which is reached by this apparatus, the operator 252 calls the spectators' attention to the fact that centrifugal force has overcome gravity and is then supporting that spectator off the ground. The lights of chamber 24 are then turned on and the spectators can each visually observe that he is raised from his previous position of support on the floor 31 and that all other spectators are in the same situation.

The movie projector then continues to describe a return flight while the speed of rotation of subassembly 24 is again reduced imperceptibly to the audience at a rate of $\frac{1}{20}$ r.p.m. per second until the subassembly 24 is stationary and the spectator support sleds again rest on floor 31 or 231. The spectators then leave by upper tier exit 35 and lower tier exit 34 from upper tier 321 and lower tier 230, respectively.

Figure 15:
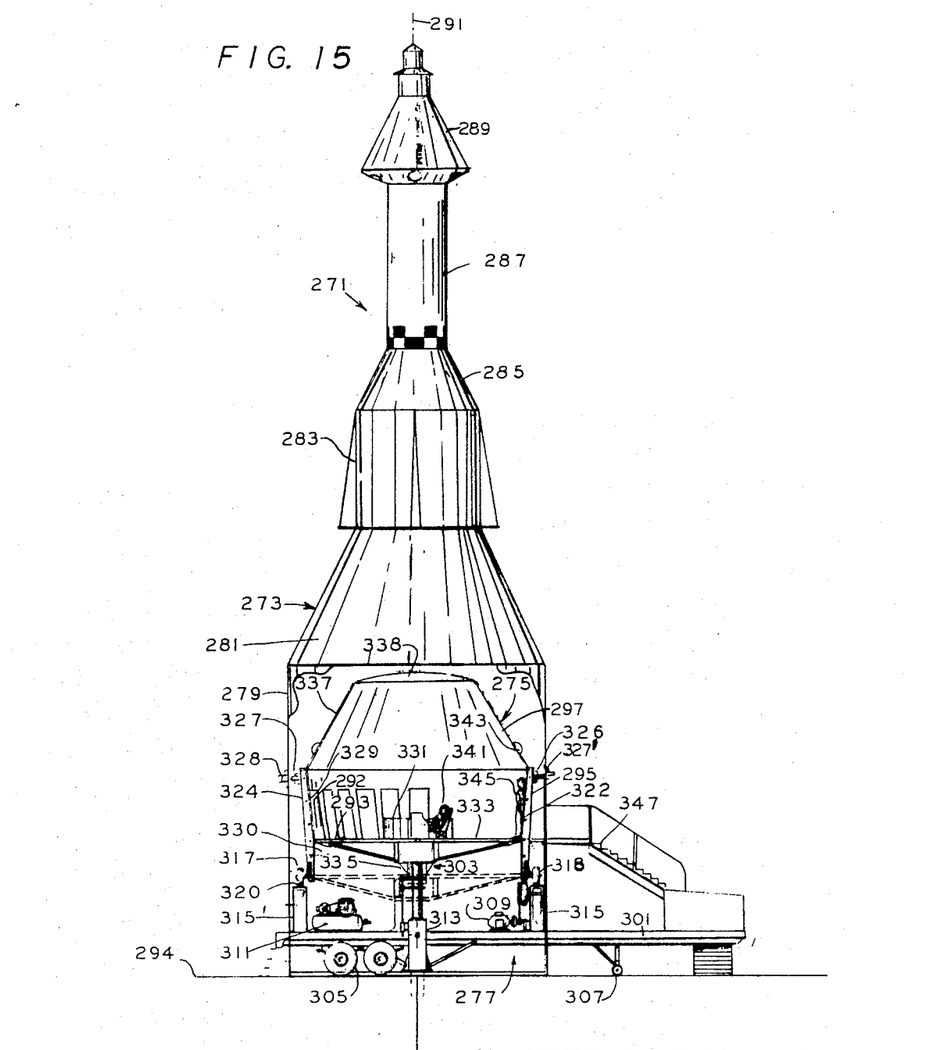
FIGURE 15 is another embodiment of my invention.

Generally, the apparatus 271 of this invention comprises a peripheral shell subassembly 273, a rotatable spectator chamber or theater subassembly 275, and a drive and a support subassembly mechanism 277 for the spectator chamber subassembly. The shell subassembly 273 comprises a lowermost, right, vertical, cylindrical portion 279, the top of which is continuous with and attached to a shell portion 281 thereabove: portion 281 has the shape of a truncated cone. Above and attached to and continuous with the truncated conical portion 281 is another elongated, cylindrical portion 283; an upper truncated portions 285 attached to thereabove and supported thereon and continuous therewith connects to a second cylindrical portion 287, generally in the shape of a rocket booster; the top portion 289 of the shell 271 has an exterior which simulates a rocket projectile: this latter portion is provided as an illustration of another embodiment of shell appearance. The entire shell 273 is a metallic shell but may be, above subassembly 275, a self-supporting, air-inflated building structure formed of plastic and/or rubber sheet in the general manner shown in U.S. Patent 2,921,592.

Conventional sets of guy wires attached to the shell 273 and to the ground hold the shell structure in position. The central longitudinal axes of all of the cylindrical surfaces 279, 281, 283, 285 and 287 are coaxial, and the central longitudinal axis of portion 289 is coaxial with such central axes along a vertical central shell axis 291.

The subassembly 275 is rotatably supported for rotation about a vertical axis on supports borne by and firmly attached to the support subassembly, 277 and to the ground 294.

The theater subassemby 275 comprises a floor subassembly 293, a circular spectator support subassembly ring 295, a theater ceiling subassembly 297 above and supported on and attached at its bottom to the top of the subassembly 295, and a projector and control subassembly 299 at the center portion of the floor 293 and operating to project pictures on the subassembly 297. The projector and control subassembly 299 and the ceiling subassembly 297 and the ring 295 all have their vertical, central longitudinal axis coaxial with the axis of rotation of the theater subassembly.

The theater subassembly is radially symmetrical about its vertical, central, longitudinal axis which is coaxial with its axis of rotation 291.

The drive and support subassembly 277 comprises a stationary, firmly supported, generally flat and level platform 301 such as 93 above described and a spectator subassembly drive and support mechanism 303 thereon. In the preferred embodiment, in order to make the entire apparatus readily movable, platform 301 is provided by a bed truck trailer arranged to be stationary and firmly supported on the ground. The bed of the truck is supported on a conventional set of eight rear wheels 305, and central front jacklegs, and a plurality of laterally extending, sturdy jackleg I-beams each firmly attached to the platform and extending to both sides of the platform and each supported laterally, as by lateral jacklegs to provide additional stability to the platform and structures supported thereon.

The drive and support mechanism comprises a motor 309, compressor 311, and a rotatable support 313 for vertically adjustable floor subassembly 293. An annular, vertically-extending ring support 315 is attached to and supported on platform 301. Platform 301 supports an annular raceway for eight, equispaced ring support wheels, as 317 and 318. The wheels as 317 and 318 which are rotatably attached to ring 295 and support that ring each seat in an annular raceway 320 located on top of support 315 and comprising a steel U-sectioned annular channel. The channel 320 is formed of two parallel, concentric, circular, steel rings each with a vertical height of about 8 inches and a wall thickness of ¼ inch and a flat annular ring of ¾-inch steel plate and 4-inch width. The flat annular ring is joined to the bottom of the concentric rings firmly by welding and that flat channel is firmly fixed to the top of the support 315.

The ring 295 is, generally, a vertically-elongated annulus with its central vertical geometric and rotation axis along axis 291: its outer, rigid wall 322 has vertically and radially extending ribs, as 324. The ribs have attached thereto a rigid, circular belt 326. Belt 326 supports a series of horizontal wheels as 327′ and 327, each rotatable about a vertical axis and contacting a circular raceway 328 concentric with belt 326 about axis 291 and supported on and guyed by wires to the ground 294. Ring 295 has an upper, outwardly-sloped, inner surface portion 329 and a lower, cylindrical portion 330. Spectators rest against pads as 292 located on the sloped surface 329.

The wheels, as 326, which bear on raceway 328 laterally stabilize the subassembly 275 during its rotation about axis 291.

The floor subassembly 293 comprises an operator platform subassembly 331, a circular floor plate 333, and an upright, cylindrical support shaft 335. Shaft 335 is firmly attached to and supports the center of platform 331 and rotatably and adjustably seats in support 313. These subassemblies all have a common central, vertical, longitudinal axis 291. The floor plate 333 is keyed to wall portion 330 and, although the floor is axially movable with respect to that wall, they rotate together.

The rigid ceiling is attached to and supported on wall 322 and comprises a truncated conical wall 337 supporting a flat, central screen 338. Subassembly 331 has controls for the motor 309 to rotate the subassembly 275 and to actuate compressor 311. Compressor 311 is operatively connected to and raises and lowers the shaft 335 at the control of the operator 341.

The assembly 331 has a motion picture projector and broadcasting system 343 under the control of an operator 341 seated in that subassembly. The optical axis of the system 343 is along axis 291 and is directed at the center of the screen 338. The slope of the wall portion 329 to the horizontal is such that, at a predetermined rotational velocity of the subassembly 275, centrifugal force holds the spectators against that outwardly-sloped wall and supports such spectators so that the floor plate 333 may be safely moved downward from and out of contact and supporting position for such spectators. The slope of the wall and the rate of revolution of the apparatus and the size of apparatus are as follows:

$$g = 4\pi^2 n^2 \sin \alpha \cos \alpha$$

(as in column 7 above) wherein $r$=radius in feet of the portion of wall 329 closest to axis 291 ($\pm 0.5\%$)

$n$=revolutions per second of assembly 275 $\pm 2\%$ $\alpha$=angle of sloped wall 329 with respect to the horizontal $\pm 1°$ $g$=acceleration due to gravity In a particular embodiment of this apparatus 271, $r=10'0''$, $n=34.5$ r.p.m. and $\alpha=75°$.

In operation, spectators as 345 enter chamber 275 by a horizontally-elongated ramp 347 positioned at the periphery of the shell 273.

In the apparatus of FIGURE 15, the spectator chamber is sufficiently rapidly revolved about its central axis 291 so that centrifugal force supports and holds the spectators vertically in place against the sides thereof after a certain minimum speed ($n$) has been reached. Thereupon, the floor 333 is controlled to move downward relatively to the shell which rotates at a fixed level. As shown in the drawing, the shell would have a 26-foot 4-inch diameter, the rotating assembly would have a 20-foot 0-inch diameter, and the roof would have a 12-foot 6-inch diameter. The centrifugal force would simulate the $g$ force holding astronauts in place during their "takeoffs." There is coordination of the description of the simulated view projected on the roof of the spectator chamber by an operator at the center of the platform during the simulated ride so that the spectator is vertically supported by centrifugal force when the view of the simulated ride is one corresponding to a view from an extraterrestrial position whereat the force of gravity on the spectator would be overcome.

Figures 14, 16:
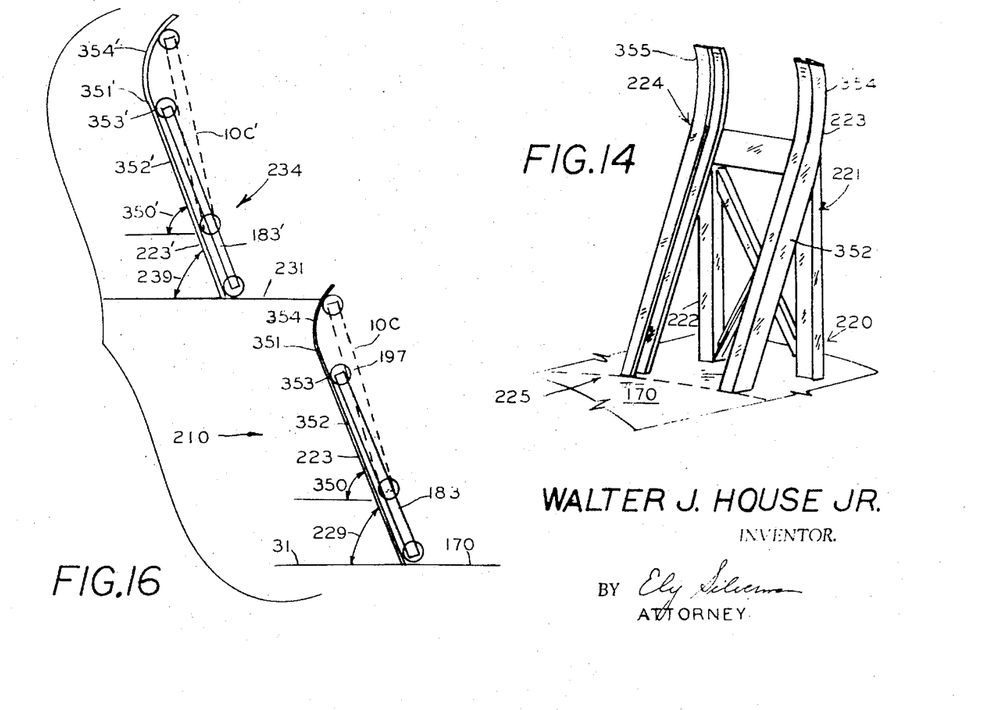
FIGURE 14 is a perspective view of a sled support subassembly 220.
FIGURE 16 diagrammatically shows the relations between the angles of parts of an assembly as 210 in a lower ring 230 of passenger support sled subassemblies and sled support subassemblies as 181 and 220 and the floor 31 on which supported, and a corresponding assembly as 234 in an upper ring 232 of passenger support sled subassemblies and sled support subassemblies similar to 181 and 220 and the upper floor 231 on which such latter assembly is supported.

As shown in FIGURE 16, the angle 229 between the plane of intial movement of the movable sled subassembly 181—which subassembly comprises the frame 183 and the cushion support subassembly 192 pivotally attached to said frame—is less in the lower ring or tier 230 than the angle 239 between the frame 183′ and floor 231 for initial movement of the sled subassembly 183′ in the upper tier 232 of sled and sled support subassemblies.

The vertical height 351 of the straight portion 352 of each channel as 223 and 224 is two feet greater than the height of the contact point 353 of the upper of the set of wheels, as 186 and 197, of each movable passenger support frame as 183 (which upper wheels press radially measuring from axis 77 on such channels 223 and 224 during rotation of the subassembly 24) when the subassembly 181 is at its lowest position. Each channel as 223 and 224 is curved above the point 351: this curved portion has a 12-foot radius of curvature and is integral and continuous with and tangent to the direction of the straight portion of the channel therebelow. Accordingly, the height of rise of the subassembly 181 on rotation of subassembly 24 at a speed of rotation such that $4\pi^2 n^2 r \sin \alpha \cos \alpha = g$ (defined as in column 7 above) will be substantially equal to the difference in height between points 351 and 353.

The angle 239 for the sled support subassemblies of the tier 232 is set so that the sled subassemblies and their frames as 183' of tier 232 rise at the same speed of rotation as causes the subassemblies as 181 to rise in the lower tier or ring 230 as above described.

On movement of the subassemblies as 181 upward and outward to the elevated position as 10C (shown in dotted lines in FIGURE 16 as well as in FIGURE 4), and 10C' for subassembly 181', while centrifugal force on the subassemblies as 183 increases as the distance of the center of gravity of the combination of spectator and subassembly as 181 from the axis of rotation 77 increases, after the height of the contact point 353 of the upper set of wheels as 186 and 197 of each upwardly moved movable spectator support frame as 183 passes point 351 (and 351' for frame 181') and each of such upper set of wheels rest on the inwardly (to axis 77) curved portions—as 354 and 355 of the members 223 and 224 respectively—the angle 350 between the subsequent plane of movement of the frame 183 with the horizontal is gradually increased over the value of angle 229 of initial movement of the subassembly 181. This results in an equilibrium elevated position, as 10C, of all the subassemblies as 181 at the same height of about two feet above the level of the floor 31, as all the frame support subassemblies as 220 are similar in size, angle and distance from axis 77 at any given speed of rotation for a subassembly 24 of fixed dimension.

The sled support subassemblies of tier 232 have the same relation between the initial height 353' of the point of radial support for subassemblies as 183' in tier 232 as above discussed for frame 183 in tier 230. The height 351' of the point at which the straight portion 352' of the sled support subassembly channels as 223' becomes curved as at 354' and the relations of the items 183', 351', 352', 353' and 354' of all the subassemblies of tier 232 are the same as the relations of items 183, 351, 352, 353 and 354 above discussed for the subassemblies of tier 230 except for the angle 239 the base of the sled supports of tier 232 makes the horizontal upper tier floor 231 and these sled support subassemblies of tier 232 are identical in structure with each other and with the sled support subassemblies for tier 230 but for the difference in angles 229 and 239 above described. Accordingly, the equilibrium point of all the subassemblies as 183' of tier 232 is achieved at an elevated position 10C' which is the same height above the initial rest position of such subassemblies as for item 183', i.e., about two feet above the level of the floor 231, and at an angle, as 350' to the floor 231 when the upper portion of frame 183' rests on the curved portion, as 354' of the sled support frame therefor. The angle 350' is related to the angle 239 as angle 350 is related to angle 229 as above discussed.

Figure 9:
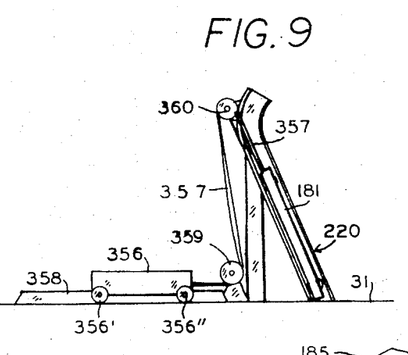
FIGURE 9 is a side view of another spectator support sled and sled support subassembly according to this invention.
Figure 10:
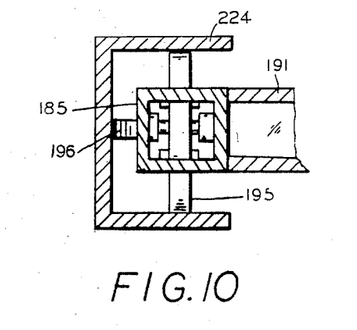
FIGURE 10 is an enlarged cross-sectional view of a sled support element as 224 and a sled element 185 along section 10A–10B of FIGURE 7, when assembled as shown in FIGURE 8.
Figure 11:
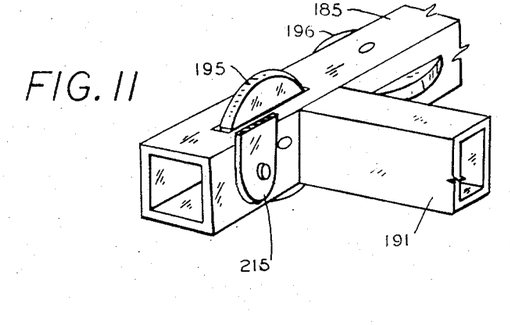
FIGURE 11 is a perspective view of one lower corner end of a spectator sled frame.
Figure 12:
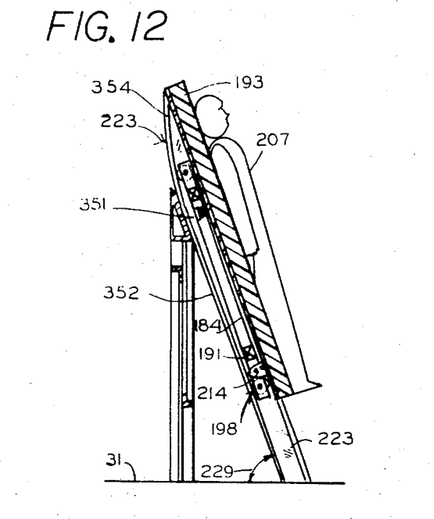
FIGURE 12 is a longitudinal, sectional view of a spectator support sled subassembly 181 as seen along plane 12A–12B of FIGURE 8 elevated in position and compressed in condition as shown at 10C in FIGURE 3.
Figure 13:
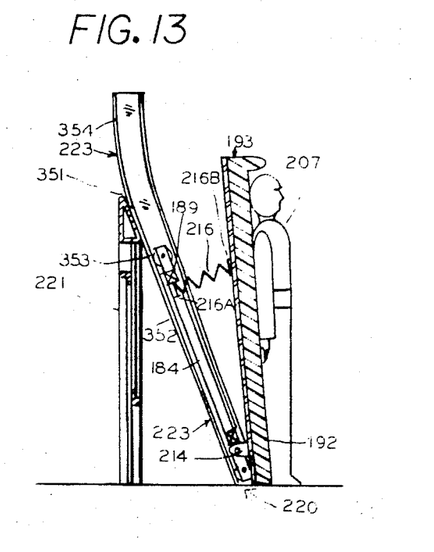
FIGURE 13 is a longitudinal, sectional view of a spectator support sled subassembly 181 as seen along plane 12A–12B of FIGURE 8 in lowered position and expanded condition as shown at 13C in FIGURES 3 and 4.

In the embodiment of sled support subassembly and spectator sled shown in FIGURE 9 an auxiliary weight, 356, is provided to assist in the levitation of each of the spectator subassemblies as 181 during rotation of apparatus 24. The weight 356 is attached to frame 183 by a cable 357. The weight 356 is movably supported, as on rollers 356' and 356'', and constrained to move only in radial direction with respect to axis 77 by a pair of parallel guides, as 358. A center line parallel to the lengths of those parallel guides and halfway between the guides extends radially from axis 77. The cable 357 is attached by rollers 359 and 360 to the support subassembly 220. Roller 359 is attached to the floor subassembly as 31 so that the portion of the cable 357 extending from the mass 356 to the roller 359 is parallel to the floor 31. The roller 360 is located on the top of sled support subassembly as between portions 223 and 224 of the particular sled support subassembly 220 above discussed and is of sufficiently large diameter, i.e., preferably 5 to 6 inches, so that the portion of the cable 357 extending from the roller 360 to the cross-member 189 of frame 183 is also parallel to the direction of movement of that subassembly during the initial motion thereof upward along the straight portion of the members as 223 and 224 of sled support subassembly 220. On rotation of the subassembly 24 the centrifugal force on all the masses as 356 assists in the levitation of all the subassemblies as 181.

Although in accordance with the provision of the patent statutes, particular preferred embodiments of this invention have been described and the principles of the invention have been described in the best mode in which it is now contemplated applying such principles, it will be understood that the operations, constructions and compositions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claim.

I claim:

1. Apparatus for a simulated extraterrestrial ride comprising an optical enclosure chamber, said chamber having a roof at its top and, at its bottom, a platform rotatable about a vertical axis, a support for said platform, a drive means operatively connected to said platform, means permitting rotation of said platform about said axis connecting said platform to said support, control means operatively connected to said drive means settable at a predetermined speed of rotation of said platform, a plurality of sled supports fixedly mounted on said platform in an array symmetrical about said axis, each sled at a distance r from said axis, a spectator support sled movably mounted on each said support, each said sled being supported on the sled support therefor for movement in a plane extending radially upward and outward of said axis at an angle $\alpha$, the relation between the angle $\alpha$ and the location of the sled and such platform being that $1/r$ is inversely proportional to the value of product of $(\sin \alpha) \times (\cos \alpha)$, and means for generating an optical image along said vertical axis of rotation on the roof of said chamber, and wherein the relation between the angle $\alpha$ at which the sleds are supported relative to the rotating platform, speed of rotation of said platform and the location of each said platform is set forth by the following formula:

$$4\pi^2 n^2 r \sin \alpha \cos \alpha = g$$

wherein $n$ = the revolutions per second of the platform at which the control means is set, ±2%,
$r$ = the distance of the base of one spectator support from the axis of rotation of the platform, ±0.5%,
$\alpha$ = angle with horizontal of the spectator support at its intersection with the platform, ±1° and
$g$ = the acceleration of gravity at the point geographically where the ride occurs, and wherein a plurality of rows of sled supports are mounted on said rotating platform, the second row of sled supports being mounted peripherally of the first row of supports and the angle $\alpha$ of said plane for said second row of sled supports being larger than the angle α for said first row.

References Cited

UNITED STATES PATENTS

| | | | |
|---|---|---|---|
| 2,861,806 | 11/1958 | Disney. | |
| 706,891 | 8/1902 | Bramhall | 272—16 |
| 801,669 | 10/1905 | Maxim | 272—28 |
| 920,567 | 5/1909 | Hayes | 272—46 |
| 2,701,137 | 2/1955 | Hoffmeister | 272—46 |
| 2,780,460 | 2/1957 | Eyerly | 272—48 |

FOREIGN PATENTS

| | | |
|---|---|---|
| 55,997 | 6/1952 | France. |
| 829,870 | 1/1952 | Germany. |

ANTON O. OECHSLE, Primary Examiner

ARNOLD W. KRAMER, Assistant Examiner

U.S. Cl. X.R.

35—12; 272—29, 48